(12) United States Patent
Ono et al.

(10) Patent No.: US 11,724,329 B2
(45) Date of Patent: Aug. 15, 2023

(54) ARC WELDING CONTROL METHOD

(71) Applicant: DAIHEN CORPORATION, Osaka (JP)

(72) Inventors: Kohei Ono, Osaka (JP); Toshiaki Nakamata, Osaka (JP)

(73) Assignee: DAIHEN CORPORATION, Osaka (JP)

( * ) Notice: Subject to any disclaimer, the term of this patent is extended or adjusted under 35 U.S.C. 154(b) by 530 days.

(21) Appl. No.: 16/477,646

(22) PCT Filed: Jan. 12, 2018

(86) PCT No.: PCT/JP2018/000677
§ 371 (c)(1),
(2) Date: Jul. 12, 2019

(87) PCT Pub. No.: WO2018/139222
PCT Pub. Date: Aug. 2, 2018

(65) Prior Publication Data
US 2019/0337080 A1    Nov. 7, 2019

(30) Foreign Application Priority Data

Jan. 24, 2017 (JP) ................................ 2017-010465
Apr. 3, 2017 (JP) ................................ 2017-073692

(51) Int. Cl.
*B23K 9/073* (2006.01)
*B23K 9/12* (2006.01)
(52) U.S. Cl.
CPC ............... *B23K 9/073* (2013.01); *B23K 9/12* (2013.01)
(58) Field of Classification Search
CPC .......... B23K 9/073; B23K 9/095; B23K 9/12; B23K 9/124; B23K 9/173
(Continued)

(56) References Cited

U.S. PATENT DOCUMENTS 2,452,573 A  * 11/1948  Johnson ................. B23K 11/26
                                                        219/108
2,504,868 A  *  4/1950  Muller .................... B23K 9/173
                                                        219/137.7
(Continued)

FOREIGN PATENT DOCUMENTS

JP            S6171179 A  *  4/1986
JP         H08108277 A  *  4/1996
(Continued)

OTHER PUBLICATIONS

16477646_2022-08-23_JP_S6171179_A_M.pdf (Year: 1986);.*
(Continued)

*Primary Examiner* — Nathaniel E Wiehe
*Assistant Examiner* — Ket D Dang
(74) *Attorney, Agent, or Firm* — Greenblum & Bernstein, P.L.C.

(57) ABSTRACT

An arc welding control method for controlling welding in which a material of a welding wire is aluminum or an aluminum alloy, and a feed speed Fw of the welding wire is alternately switched between a forward feed period and a reverse feed period to repeat a short circuit period and an arc period, a welding current Iw is controlled so that an average value of maximum values of the welding current Iw during the short circuit period is 150 A or less. A reverse feed peak value Wrp during the reverse feed period is set so that an average value of time lengths of the short circuit period is 7 ms or less. Accordingly, the current value can be reduced when the short circuit is released and the lengthening in the short circuit period can be prevented, so that the spatter generation amount can be reduced.

14 Claims, 4 Drawing Sheets

(58) Field of Classification Search
USPC .............. 219/137.7, 137.137, 137.2, 130.01,
219/130.21, 130.31, 130.32, 130.33,
219/137 PS, 130.51, 108, 109, 110, 117.1
See application file for complete search history.

(56) References Cited

U.S. PATENT DOCUMENTS

| | | | | |
|---|---|---|---|---|
| 3,202,871 | A * | 8/1965 | Shelar | H05B 39/042 |
| | | | | 315/158 |
| 4,469,933 | A * | 9/1984 | Mizuno | B23K 9/091 |
| | | | | 219/130.21 |
| 5,406,045 | A * | 4/1995 | Kiriishi | B23K 11/257 |
| | | | | 219/110 |
| 6,512,200 | B2 * | 1/2003 | Norrish | B23K 9/0953 |
| | | | | 219/137 PS |
| 7,138,602 | B2 | 11/2006 | Huismann et al. | |
| 7,705,270 | B2 | 4/2010 | Norrish et al. | |
| 2002/0030043 | A1 * | 3/2002 | Tong | B23K 9/125 |
| | | | | 219/137 PS |
| 2006/0043082 | A1 * | 3/2006 | Martin | B23K 9/32 |
| | | | | 219/130.5 |
| 2008/0083716 | A1 * | 4/2008 | Shigeyoshi | B23K 9/121 |
| | | | | 219/125.12 |
| 2009/0114631 | A1 | 5/2009 | Chevalier et al. | |
| 2009/0173726 | A1 * | 7/2009 | Davidson | G05B 19/40937 |
| | | | | 219/130.01 |
| 2012/0111842 | A1 | 5/2012 | Fujiwara et al. | |
| 2012/0223063 | A1 | 9/2012 | Tanaka et al. | |
| 2013/0082041 | A1 * | 4/2013 | Kawamoto | B23K 9/09 |
| | | | | 219/137.71 |
| 2016/0303679 | A1 | 10/2016 | Ide | |
| 2016/0368076 | A1 * | 12/2016 | Ide | B23K 9/125 |
| 2018/0354048 | A1 | 12/2018 | Tanaka et al. | |
| 2019/0084068 | A1 * | 3/2019 | Furuyama | B23K 9/1012 |

FOREIGN PATENT DOCUMENTS

| | | | |
|---|---|---|---|
| JP | 2000343234 A | * | 12/2000 |
| JP | 2009-113117 A | | 5/2009 |
| JP | 2011-73022 A | | 4/2011 |
| JP | 5201266 B2 | | 2/2013 |
| JP | 2016-144820 A | | 8/2016 |
| WO | 2011/064952 A1 | | 6/2011 |

OTHER PUBLICATIONS

16477646_2022-08-23_JP_2000343234_A_M.pdf (Year: 2000).*
16477646_2022-08-23_JP_H08108277_A_M.pdf (Year: 1996).*
JP_S6171179_A_I.pdf (Year: 1986).*
JPS6171179A_translation-From-Espacenet.pdf (Year: 1986).*
Extended European Search Report in European Application No. 18745397.2 dated Oct. 5, 2020.
Feng J. et al: "The CMT short-circuiting metal transfer process and its use in thin aluminium sheets welding", Materials and Design, London, GB, vol. 30, No. 5, Jul. 18, 2008, pp. 1850-1852.
International Search Report issued in International Patent Application No. PCT/JP2018/000677, dated Apr. 10, 2018.
Written Opinion of the International Searching Authority issued in International Application No. PCT/JP2018/000677, dated Apr. 10, 2018.
Jan. 18, 2023 European Office Action in European Application No. 18745397.2.

* cited by examiner

ARC WELDING CONTROL METHOD

TECHNICAL FIELD

The present invention relates to an arc welding control method for controlling welding in which a material of a welding wire is aluminum or an aluminum alloy, and a feed speed of the welding wire is alternately switched between a forward feed period and a reverse feed period to repeat a short circuit period and an arc period.

BACKGROUND ART

In general consumable electrode-type arc welding, the welding is performed by feeding a welding wire as a consumable electrode at a constant speed, and generating an arc between the welding wire and a base material. In the consumable electrode-type arc welding, a welding state of alternately repeating the welding wire and the base material in a short circuit period and an arc period is often obtained.

In order to further improve the welding quality, a welding method of periodically repeating forward feed and reverse feed of a welding wire has been proposed. In the invention of Patent Literature 1, an average value of feed speeds according to a set value of a welding current is used, and the frequency and the amplitude of forward and reverse feed of the welding wire are set according to the set value of the welding current.

When the material of the welding wire is steel or stainless steel, in order to reduce the spatter generation amount, current control is performed to detect a sign that an arc is generated from a short circuit period and rapidly reduce the welding current to several tens of amperes. The sign arc generation is made by detecting the generation of constriction in the droplet and the increase in resistance value of the droplet. Thus, this current control is called constriction detection control.

PRIOR ART

Patent Literature

Patent Literature 1: Japanese Patent No. 5201266

SUMMARY OF INVENTION

Problem to be Solved by the Invention

When the material of the welding wire is aluminum or an aluminum alloy (hereinafter referred to as aluminum material), the resistance value is small, making it difficult to detect the generation of the constriction due to the increase in the resistance value. Thus, it is impossible to detect a sign that an arc is generated during the short circuit period and perform constriction detection control to sharply reduce the welding current. As a result, there is a problem that the spatter generation amount increases.

Accordingly, an object of the present invention is to provide an arc welding control method for controlling a welding method in which a material of a welding wire is aluminum or an aluminum alloy, and a feed speed of the welding wire is alternately switched between a forward feed period and a reverse feed period, which can reduce a spatter generation amount.

Means for Solving the Problem

In order to solve the above object, an arc welding control method according to the present disclosure relates to an arc welding control method for controlling welding in which a material of a welding wire is aluminum or an aluminum alloy, and a feed speed of the welding wire is alternately switched between a forward feed period and a reverse feed period so that a short circuit period and an arc period are repeated, wherein the welding current is controlled so that an average value of maximum values of the welding current during the short circuit period is 150 A or less.

In the arc welding control method according to the present disclosure, a reverse feed peak value during the reverse feed period is set so that an average value of time lengths of the short circuit period is 7 ms or shorter.

In the arc welding control method according to the present disclosure, an absolute value of the reverse feed peak value is set to at least 40 m/minute or more.

In the arc welding control method according to the present disclosure, the average value of the time lengths of the short circuit period is detected, and feedback control is performed on the reverse feed peak value during the reverse feed period so that the average value of the time lengths of the short circuit period is equal to a predetermined short circuit time setting value.

In the arc welding control method according to the present disclosure, the average value of the time lengths of the short circuit period is detected, and feedback control is performed on a reverse feed deceleration period so that the average value of the time lengths of the short circuit period is equal to a predetermined short circuit time setting value.

In the arc welding control method according to the present disclosure, the welding current during the short circuit period is controlled to a predetermined initial current value during a predetermined initial period, and thereafter controlled to increase with time, and the initial period is set to 1.5 ms or longer.

Advantageous Effects of Invention

According to the present invention, in a welding method in which a material of a welding wire is aluminum or an aluminum alloy, and a feed speed of the welding wire is alternately switched between a forward feed period and a reverse feed period, a spatter generation amount can be reduced.

EMBODIMENTS FOR CARRYING OUT THE INVENTION

Hereinafter, embodiments of the present invention will be described with reference to the drawings.

First Embodiment

Figure 1:
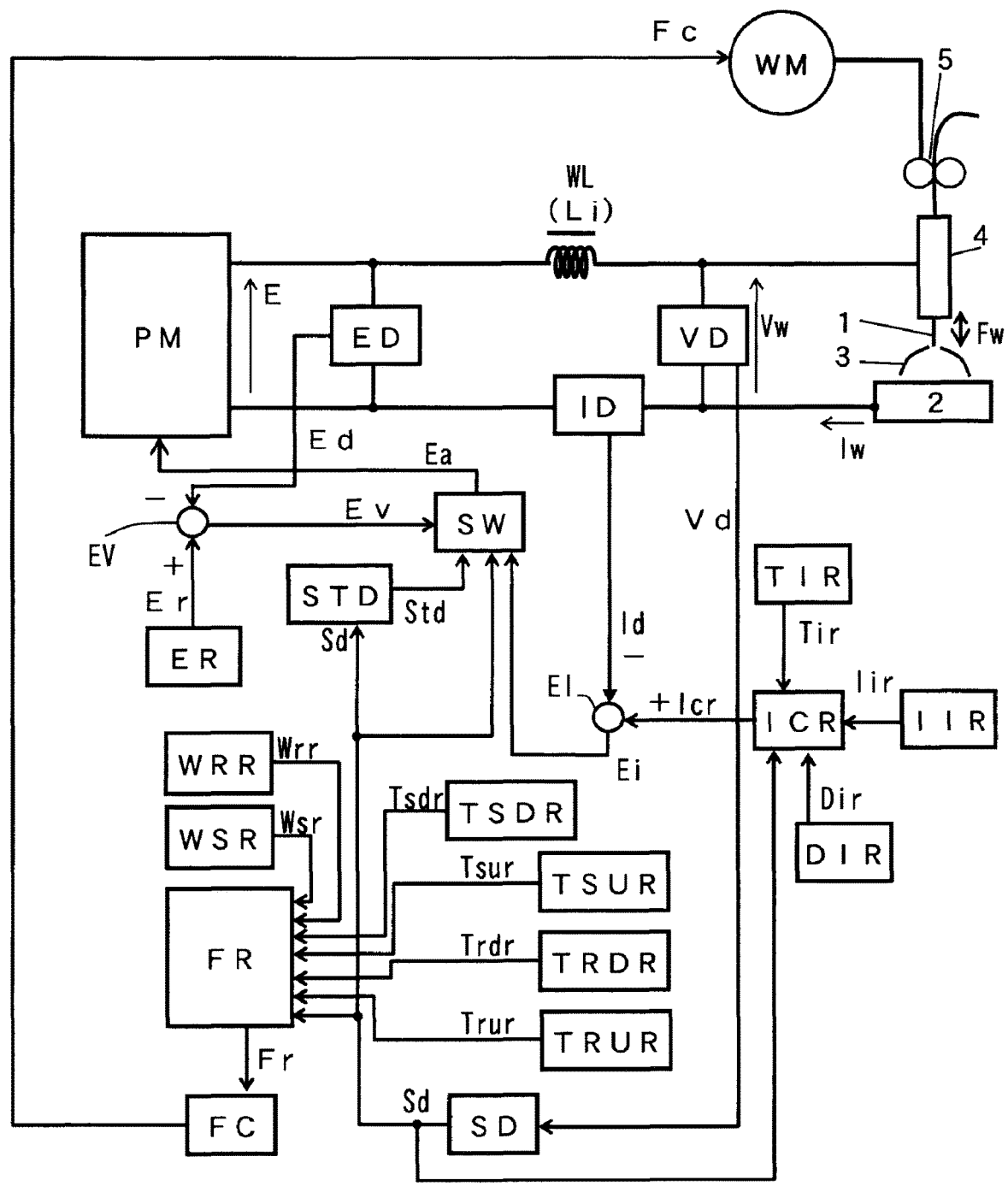
FIG. 1 is a block diagram of a welding power source for performing an arc welding control method according to a first embodiment of the present invention.

FIG. 1 is a block diagram of a welding power source for performing an arc welding control method according to a first embodiment of the present invention. Hereinafter, each block will be described below with reference to FIG. 1.

A power source main circuit PM receives an output from a 3-phase 200 V commercial power source (not shown) or the like, performs output control by inverter control according to an error amplification signal Ea to be described later, and outputs an output voltage E. The power source main circuit PM includes a primary rectifier for rectifying the commercial power source, a smoothing capacitor for smoothing a rectified direct current, an inverter circuit driven by the error amplification signal Ea and converting the smoothed direct current into a high-frequency alternating current, a high-frequency transformer for stepping down the high-frequency alternating current to a voltage value suitable for welding, and a secondary rectifier for rectifying the step-down high-frequency alternating current into a direct current, which are not shown.

A reactor WL smoothes the output voltage E. The inductance value of the reactor WL is, for example, 100 µH.

A feed motor WM receives a feed control signal Fc to be described later as an input and alternately repeats forward feed and reverse feed to feed a welding wire 1 at a feed speed Fw. A motor with fast transient response is used as the feed motor WM. In order to increase the change rate of the feed speed Fw of the welding wire 1 and speed up the reversal of the feed direction, the feed motor WM may be provided near a tip of a welding torch 4. In addition, two feed motors WM may be used to form a push-pull type feed system.

The welding wire 1 is fed inside the welding torch 4 by the rotation of a feed roll 5 coupled to the feed motor WM, and an arc 3 is generated between the welding wire 1 and a base material 2. A welding voltage Vw is applied between a power source tip (not shown) in the welding torch 4 and the base material 2, and thus a welding current Iw is energized. The material of the welding wire 1 and the base material 2 is aluminum or an aluminum alloy.

An output voltage setting circuit ER outputs a predetermined output voltage setting signal Er. An output voltage detection circuit ED detects and smoothes the output voltage E and outputs an output voltage detection signal Ed.

A voltage error amplification circuit EV receives the output voltage setting signal Er and the output voltage detection signal Ed as inputs, amplifies an error between the output voltage setting signal Er(+) and the output voltage detection signal Ed(−), and outputs a voltage error amplification signal Ev.

A current detection circuit ID detects the welding current Iw and outputs a current detection signal Id. A voltage detection circuit VD detects the welding voltage Vw and outputs a voltage detection signal Vd. A short circuit determination circuit SD receives the voltage detection signal Vd as an input, and outputs a short circuit determination signal Sd which is determined to be at a short circuit period and at a high level when the value of the voltage detection signal Vd is less than a predetermined short circuit determination value (about 10 V), and is determined to be at an arc period and at a low level when the value of the voltage detection signal Vd is equal to or larger than the predetermined short circuit determination value.

A forward feed acceleration period setting circuit TSUR outputs a predetermined forward feed acceleration period setting signal Tsur.

A forward feed deceleration period setting circuit TSDR outputs a predetermined forward feed deceleration period setting signal Tsdr.

A reverse feed acceleration period setting circuit TRUR outputs a predetermined reverse feed acceleration period setting signal Trur.

A reverse feed deceleration period setting circuit TRDR outputs a predetermined reverse feed deceleration period setting signal Trdr.

A forward feed peak value setting circuit WSR outputs a predetermined forward feed peak value setting signal Wsr.

A reverse feed peak value setting circuit WRR outputs a predetermined reverse feed peak value setting signal Wrr.

A feed speed setting circuit FR receives the forward feed acceleration period setting signal Tsur, the forward feed deceleration period setting signal Tsdr, the reverse feed acceleration period setting signal Trur, the reverse feed deceleration period setting signal Trdr, the forward feed peak value setting signal Wsr, the reverse feed peak value setting signal Wrr and the short circuit determination signal Sd as inputs, and outputs a feed speed pattern generated by the following process as a feed speed setting signal Fr. When the feed speed setting signal Fr is 0 or more, it becomes a forward feed period, and when the feed speed setting signal Fr is less than 0, it becomes a reverse feed period.

1) During a forward feed acceleration period Tsu determined by the forward feed acceleration period setting signal Tsur, a feed speed setting signal Fr which is linearly accelerated from 0 to a forward feed peak value Wsp, i.e., a positive value, determined by the forward feed peak value setting signal Wsr is output.

2) Then, during a forward feed peak period Tsp, a feed speed setting signal Fr for maintaining the forward feed peak value Wsp is output.

3) When the short circuit determination signal Sd changes from a low level (arc period) into a high level (short circuit period), the period is transitioned to a forward feed deceleration period Tsd determined by the forward feed deceleration period setting signal Tsdr, and a feed speed setting signal Fr which is linearly decelerated from the forward feed peak value Wsp to 0 is output.

4) Then, during a reverse feed acceleration period Tru determined by the reverse feed acceleration period setting signal Trur, a feed speed setting signal Fr which is linearly accelerated from 0 to a reverse feed peak value Wrp, i.e., a negative value, determined by the reverse feed peak value setting signal Wrr is output.

5) Then, during a reverse feed peak period Trp, a feed speed setting signal Fr for maintaining the reverse feed peak value Wrp is output.

6) When the short circuit determination signal Sd changes from a high level (short circuit period) into a low level (arc period), the period is transitioned to a reverse feed deceleration period Trd determined by the reverse feed deceleration period setting signal Trdr, and a feed speed setting signal Fr which is linearly decelerated from the reverse feed peak value Wrp to 0 is output.

7) By repeating the steps 1) to 6), the feed speed setting signal Fr of a feed pattern changing into trapezoidal wave shape having positive and negative values is generated.

A feed control circuit FC receives the feed speed setting signal Fr as an input and outputs, to the feed motor WM, a feed control signal Fc for feeding the welding wire 1 at a feed speed Fw equivalent to the value of the feed speed setting signal Fr.

An initial period setting circuit TIR outputs a predetermined initial period setting signal Tir. An initial current setting circuit IIR outputs a predetermined initial current setting signal Iir.

A current increase rate setting circuit DIR outputs a predetermined current increase rate setting signal Dir.

A current control setting circuit ICR receives the short circuit determination signal Sd, the initial period setting signal Tir, the initial current setting signal Iir, and the current increase rate setting signal Dir as inputs, performs the following process and outputs a current control setting signal Icr.

1) During an initial period Ti determined by the initial period setting signal Tir from a time when the short circuit determination signal Sd changes into a high level (short circuit period), the initial current setting signal Iir is output as the current control setting signal Icr.

2) During the short circuit period thereafter, the current control setting signal Icr which increases with time at an increase rate Di determined by the current increase rate setting signal Dir from the value of the initial current setting signal Fr is output.

3) When the short circuit determination signal Sd changes into a low level (arc period), the current control setting signal Icr, which has a predetermined small current value, is output.

A current error amplification circuit EI receives the current control setting signal Icr and the current detection signal Id as inputs, amplifies an error between the current control setting signal Icr(+) and the current detection signal Id(−), and outputs a current error amplification signal Ei.

A small current period circuit STD receives the short circuit determination signal Sd as an input, and outputs a small current period signal Std which changes into a high level at a time when a predetermined current drop time elapses from a time when the short circuit determination signal Sd changes into a low level (arc period), and thereafter changes into a low level when the short circuit determination signal Sd changes into a high level (short circuit period).

A power source characteristic switching circuit SW receives the current error amplification signal Ei, the voltage error amplification signal Ev, the short circuit determination signal Sd and the small current period signal Std as inputs, performs the following process, and outputs an error amplification signal Ea.

1) When the short circuit determination signal Sd is at a high level (short circuit period), the current error amplification signal Ei is output as the error amplification signal Ea.

2) When the short circuit determination signal Sd changes into a low level (arc period), the voltage error amplification signal Ev is output as the error amplification signal Ea.

3) During the arc period thereafter, the current error amplification signal Ei is output as the error amplification signal Ea during a time period when the small current period signal Std is at a high level.

With this circuit, the characteristics of the welding power source are constant current characteristics during the short circuit period and the small current period, and are constant voltage characteristics during other arc periods.

Figure 2:
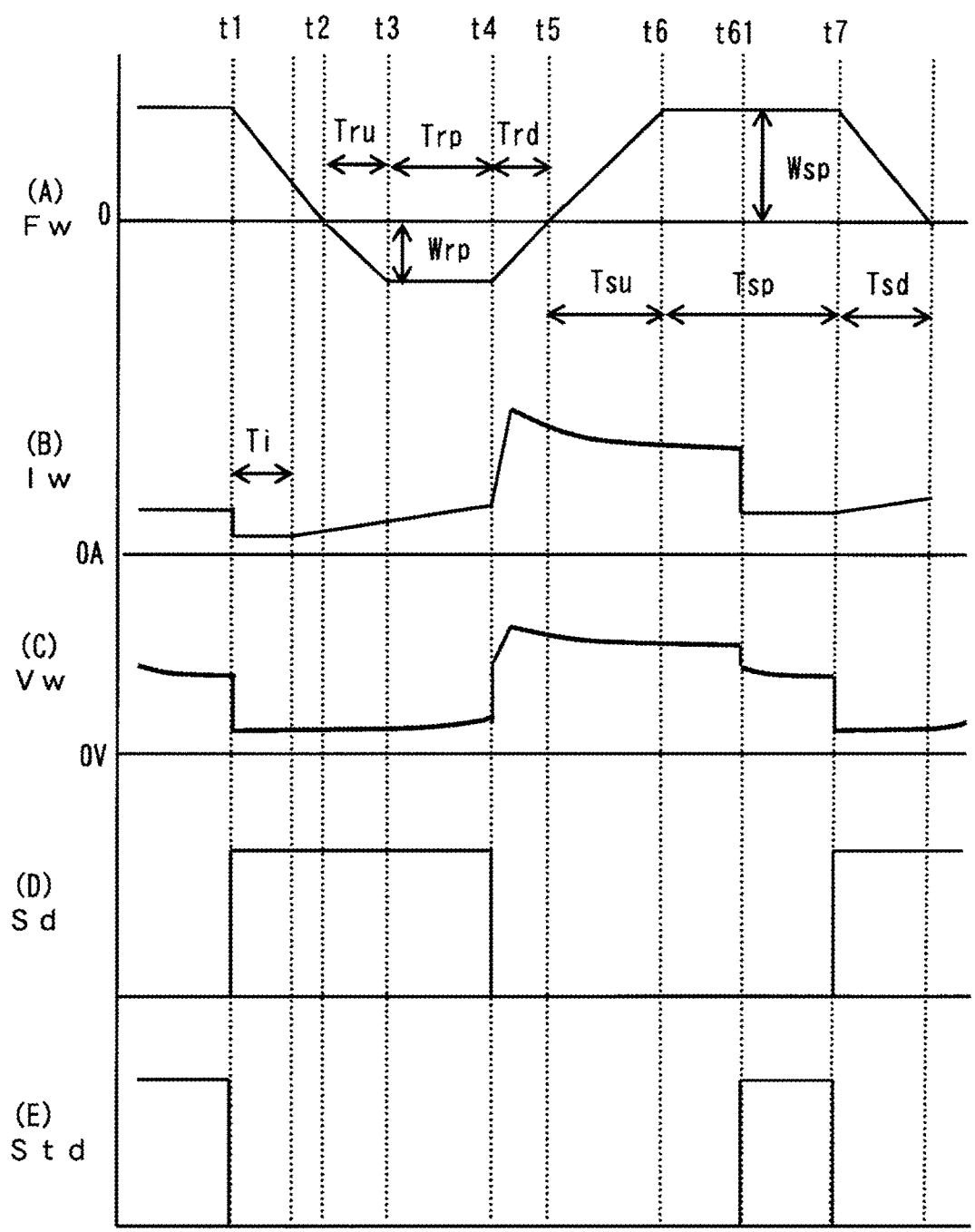
FIG. 2 is a timing chart of each signal in the welding power source of FIG. 1 showing the arc welding control method according to the first embodiment of the present invention.

FIG. 2 is a timing chart of each signal in the welding power source of FIG. 1 showing the arc welding control method according to the first embodiment of the present invention. In FIG. 2, (A) shows a time change of the feed speed Fw with time, (B) shows the change of the welding current Iw with time, (C) shows the change of the welding voltage Vw with time, (D) shows the change of the short circuit determination signal Sd with time, and (E) shows the change of the small current period signal Std with time. Hereinafter, the operation of each signal will be described below with reference to FIG. 2.

The feed speed Fw shown in (A) of FIG. 2 is controlled to the value of the feed speed setting signal Fr output from the feed speed setting circuit FR of FIG. 1. The feed speed Fw is formed from the forward feed acceleration period Tsu determined by the forward feed acceleration period setting signal Tsur of FIG. 1, the forward feed peak period Tsp continuing until a short circuit is generated, the forward feed deceleration period Tsd determined by the forward feed deceleration period setting signal Tsdr of FIG. 1, the reverse feed acceleration period Tru determined by the reverse feed acceleration period setting signal Trur of FIG. 1, the reverse feed peak period Trp continuing until an arc is generated, and the reverse feed deceleration period Trd determined by the reverse feed deceleration period setting signal Trdr of FIG. 1. Further, the forward feed peak value Wsp is determined by the forward feed peak value setting signal Wsr of FIG. 1, and the reverse feed peak value Wrp is determined by the reverse feed peak value setting signal Wrr of FIG. 1. As a result, the feed speed setting signal Fr is a feed pattern changing into a substantially trapezoidal wave shape having positive and negative values.

[Operation During Short Circuit Period from Time Points t1 to t4]

When a short circuit is generated at a time point t1 during the forward feed peak period Tsp, the welding voltage Vw rapidly decreases to a short circuit voltage value of several volts as shown in (C) of FIG. 2, so that the short circuit determination signal Sd changes into a high level (short circuit period) as shown in (D) of FIG. 2. When the short circuit period starts at the time point t1, the period is transitioned to a predetermined forward feed deceleration period Tsd from time points t1 to t2, and the feed speed Fw is decelerated from the forward feed peak value Wsp to 0, as shown in (A) of FIG. 2. For example, the forward feed deceleration period Tsd is set to be 1 ms.

As shown in (A) of FIG. 2, the feed speed Fw enters a predetermined reverse feed acceleration period Tru from time points t2 to t3, and is accelerated from 0 to the reverse feed peak value Wrp. During this period, the short circuit period continues. For example, the reverse feed acceleration period Tru is set to be 1 ms.

When the reverse feed acceleration period Tru ends at the time point t3, the feed speed Fw enters the reverse feed peak period Trp and becomes the reverse feed peak value Wrp, as shown in (A) of FIG. 2. The reverse feed peak period Trp continues until an arc is generated at a time point t4. Therefore, the time period from time points t1 to t4 is a short circuit period. The reverse feed peak period Trp is not a predetermined value, and is about 4 MS.

As shown in (B) of FIG. 2, the welding current Iw during the short circuit period from the time points t1 to t4 is an initial current Ii determined by the initial current setting signal Iir during the initial period Ti determined by the initial period setting signal Tir. Thereafter, the welding current Iw increases with time at an increase rate Di determined by the current increase rate setting signal Dir.

[Operation During Arc Period from Time Points t4 to t7]

When the droplet is transferred due to the reverse feed of the welding wire and the pinch force caused by the energization of the welding current Iw and an arc is generated at the time point t4, the welding voltage Vw rapidly increases to an arc voltage value of several tens of volts as shown in (C) of FIG. 2, so that the short circuit determination signal Sd changes into a low level (arc period) as shown in (D) of FIG. 2. When the arc period starts at the time point t4, the period is transitioned to a predetermined reverse feed deceleration period Trd from time points t4 to t5, and the feed speed Fw is decelerated from the reverse feed peak value Wrp to 0 as shown in (A) of FIG. 2. For example, the reverse feed deceleration period Trd is set to be 1 ms.

When the reverse feed deceleration period Trd ends at the time point t5, the period is transitioned to a predetermined forward feed acceleration period Tsu from time points t5 to t6. As shown in (A) of FIG. 2, during the forward feed acceleration period Tsu, the feed speed Fw is accelerated from 0 to the forward feed peak value Wsp. During this period, the arc period continues. For example, the forward feed acceleration period Tsu is set to be 1 ms.

When the forward feed acceleration period Tsu ends at the time point 6, the feed speed Fw enters the forward feed peak period Tsp and becomes the forward feed peak value Wsp as shown in (A) of FIG. 2. During this period, the arc period also continues. The forward feed peak period Tsp continues until a short circuit is generated at a time point t7. Therefore, the time period from time points t4 to t7 is an arc period. When a short circuit occurs, the operation returns to the operation at the time point t1. The forward feed peak period Tsp is not a predetermined value, and is about 4 ms. The forward feed peak value Wsp is set to, for example, 30 m/minute to 50 m/minute.

When an arc is generated at the time point t4, the welding voltage Vw rapidly increases to an arc voltage value of several tens of volts, as shown in (C) of FIG. 2. On the other hand, as shown in (B) of FIG. 2, the welding current Iw has a value which changes according to the arc load since the welding power source has a constant voltage characteristic. During this period, the melting of the welding wire is promoted to form a droplet.

At a time point t61 at which a predetermined current drop time has elapsed since an arc has been generated at the time point t4, the small current period signal Std changes into a high level as shown in (E) of FIG. 2. In response to this, the welding power source is switched from the constant voltage characteristic to the constant current characteristic. Thus, as shown in (B) of FIG. 2, the welding current Iw decreases to a predetermined small current value (about 60 A), and maintains this value until a time point t7 when a short circuit is generated. Similarly, as shown in (C) of FIG. 2, the welding voltage Vw also decreases. The small current period signal Std returns to a low level when a short circuit is generated at the time point t7. Since the current drop time is set to about 5 ms, the timing at the time point t61 is during the forward feed peak period Tsp. The reason for providing a small current period is to reduce the generation of spatter by reducing the value of the welding current Iw when a short circuit is generated at the time point t7.

In the first embodiment, the material of the welding wire and the base material is aluminum or an aluminum alloy. According to the first embodiment, the welding current Iw is controlled so that the average value of maximum values of the welding current Iw during the short circuit period is 150 A or less. The short circuit is generated about 80 times per second. The above average value is a value obtained by detecting the maximum value of the welding current Iw in each short circuit period and calculating the average value of the maximum values during a period in which welding is performed or every unit time. The control of the welding current Iw is performed by adjusting the initial period Ti, the initial current Ii or the increase rate Di. As described above, when the material of the welding wire is an aluminum material, since the constriction detection control cannot be performed, the spatter generation amount increases when the current value during the transition from the short circuit period to the arc period increases. The current value during the transition from the short circuit period to the arc period is the maximum value of the welding current Iw during the short circuit period. Therefore, by setting the average value of the maximum values of the welding current Iw during the short circuit period to 150 A or less, the spatter generation amount can be reduced. When the material of the welding wire is steel or stainless steel, this value is 350 A or more. Such a large value is to prevent the welding state from being unstable. On the other hand, since the forward feed and the reverse feed of the welding wire are performed, the stability of the welding state is maintained even if the above average value is set small when the material is aluminum. It is more preferable to set the above average value to be 100 A or less in order to further reduce the spatter.

In addition, in the first embodiment, it is preferable to set the reverse feed peak value Wrp during the reverse feed period so that the average value of the time lengths of the short circuit period is 7 ms or shorter. Since the welding current Iw is controlled so that the average value of the maximum values of the welding current Iw during the short circuit period is reduced, the transfer time of the droplet becomes longer and the short circuit period becomes longer. When the short circuit period becomes longer, the time ratio of the arc period decreases and the heat input to the base material decreases. As a result, the bead shape is influenced. When the absolute value of the reverse feed peak value Wrp is increased, the welding wire can be pulled up quickly, so that the short circuit period can be shortened. If the average value of the short circuit period is 7 ms or shorter, the influence on the bead shape will be small. On the other hand, the load on the feed motor WM is increased as the absolute value of the reverse feed peak value Wrp is increased. Thus, it is preferable that the reverse feed peak value Wrp is set so that the average value of the short circuit period is slightly shorter than a predetermined value. In order to reduce the influence on the bead shape, the average value of the short circuit period is more preferably 5 ms or shorter. Due to the reasons described above, it is preferable that the absolute value of the reverse feed peak value Wrp is at least 40 m/minute or more. When the average value of the short circuit period is 3 ms or longer, the welding state is stabilized.

Further, in the first embodiment, it is preferable that the welding current Iw during the short circuit period is controlled to a predetermined initial current Ii during a predetermined initial period Ti and thereafter controlled to increase with time, and the initial period Ti is set to 1.5 ms or longer. When the material of the welding wire is steel or stainless steel, the initial period Ti is set to 1 ms or shorter. In contrast, when the material is aluminum, by setting the initial period Ti to 1.5 ms or longer, the droplet transition state can be made smoother, and the welding state can be stabilized. It is more preferable to set the initial period Ti to 2 ms or longer in order to smooth the droplet transition state. The initial current Ii is set to about 30 A to 70 A. The increase waveform of the welding current Iw during the short circuit period is illustrated as a straight line in FIG. 2. The increase waveform of the welding current Iw may be a two-stage polygonal line or a curved line.

Second Embodiment

In the invention according to a second embodiment, the average value of the time lengths of the short circuit period is detected, and feedback control is performed on the reverse feed peak value during the reverse feed period so that the average value of the time lengths of the short circuit period is equal to a predetermined short circuit time setting value.

Figure 3:
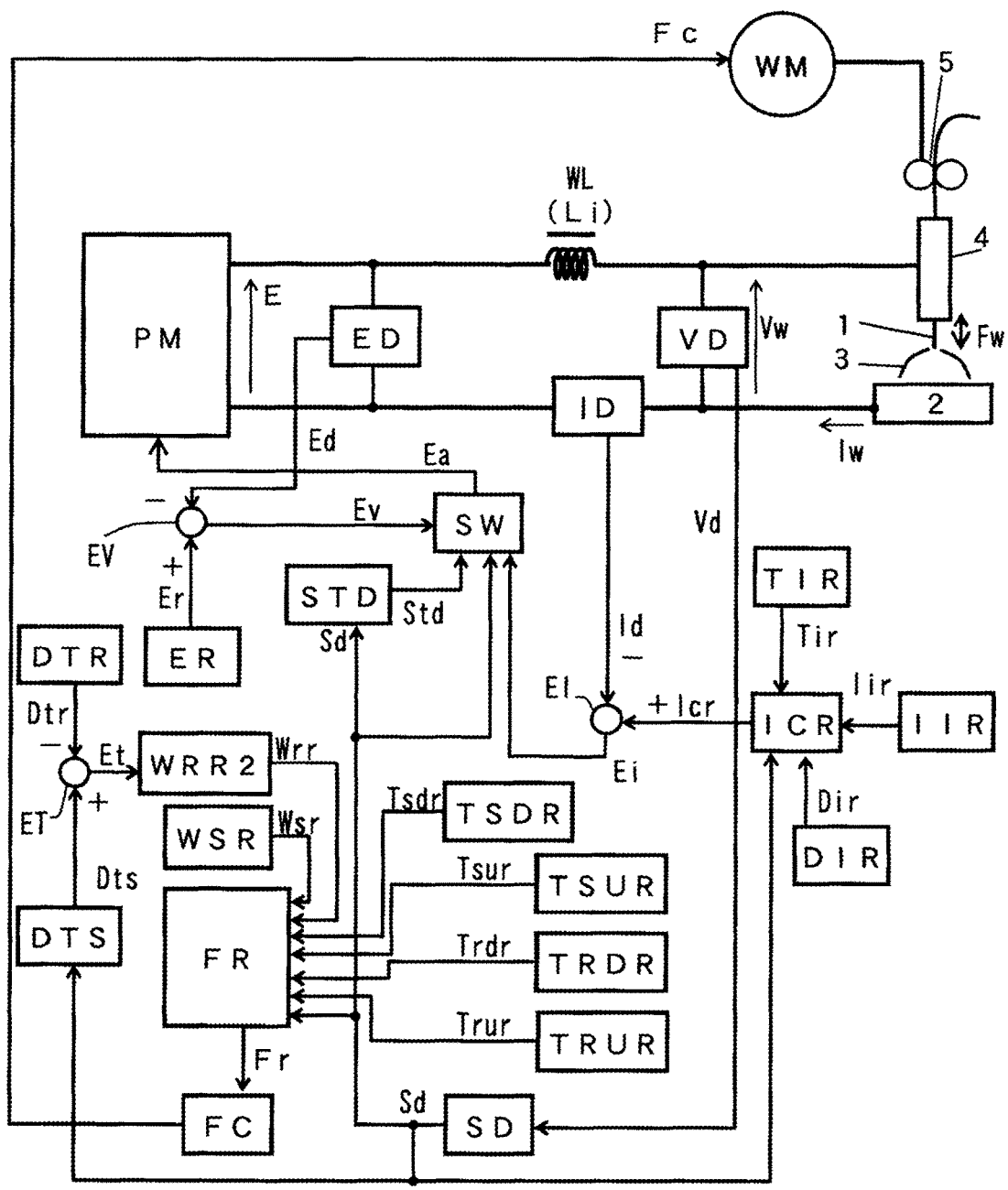
FIG. 3 is a block diagram of a welding power source for performing an arc welding control method according to a second embodiment of the present invention.

FIG. 3 is a block diagram of a welding power source for performing an arc welding control method according to the second embodiment of the present invention. FIG. 3 corresponds to FIG. 1 described above, in which the same reference numerals are attached to the same blocks, and description thereof will not be repeated. In FIG. 3, a short circuit time average value detection circuit DTS, a short circuit time setting circuit DTR, and a time error amplification circuit ET are added to the configuration in FIG. 1, and the reverse feed peak value setting circuit WRR in FIG. 1 is replaced with a second reverse feed peak value setting circuit WRR2. Hereinafter, the blocks will be described below with reference to FIG. 3.

The short circuit time average value detection circuit DTS receives the short circuit determination signal Sd as an input, measures a short circuit time when the short circuit determination signal Sd is at a high level (short circuit period), calculates the average value of short circuit time every unit time, and outputs a short circuit time average value detection signal Dts. The unit time is, for example, about 0.1 second to 1 second.

The short circuit time setting circuit DTR outputs a predetermined short circuit time setting signal Dtr. The short circuit time setting signal Dtr is preferably set in the range of 3 ms to 7 ms.

The time error amplification circuit ET receives the short circuit time setting signal Dtr and the short circuit time average value detection signal Dts as inputs, amplifies an error between the short circuit time setting signal Dtr(−) and the short circuit time average value detection signal Dts(+), and outputs a time error amplification signal Et.

The second reverse feed peak value setting circuit WRR2 receives the time error amplification signal Et as an input, integrates the time error amplification signal Et during welding, and outputs a reverse feed peak value setting signal Wrr. Integration of Wrr=Wrr0+∫Et·dt is performed during the welding. Wrr0 is a predetermined initial value. The initial value is set to, for example, −40 m/minute. With the time error amplification circuit ET and the second reverse feed peak value setting circuit WRR2, the reverse feed peak value setting signal Wrr is subjected to feedback control so that the short circuit time average value detection signal Dts is equal to the short circuit time setting signal Dtr.

Since the timing chart of each signal in the welding power source of FIG. 3 showing the arc welding control method according to the second embodiment of the present invention is the same as FIG. 2 described above, so that the description will not be repeated. However, the following points are different. In the first embodiment, the reverse feed peak value Wrp is a predetermined value. In contrast, in the second embodiment, the reverse feed peak value Wrp is subjected to feedback control so that the short circuit time average value detection signal Dts is equal to the short circuit time setting signal Dtr. Thus, the reverse feed peak value Wrp is a value which changes every moment during the welding.

According to second embodiment, in addition to the effects of the first embodiment, the following effects are obtained. In the second embodiment, the reverse feed peak value Wrp is automatically adjusted so that the average value of the time lengths of the short circuit period (short circuit time average value) is a desired value. That is, since the reverse feed peak value Wrp is automatically adjusted to the optimum value, the working efficiency is improved. Further, since the reverse feed peak value Wrp is optimized, the bead appearance is always good and the stability of the welding state is further improved.

Third Embodiment

In the invention according to a third embodiment, the average value of the time lengths of the short circuit period is detected, and feedback control is performed on a reverse feed deceleration period so that the average value of the time lengths of the short circuit period is equal to a predetermined short circuit time setting value.

Figure 4:
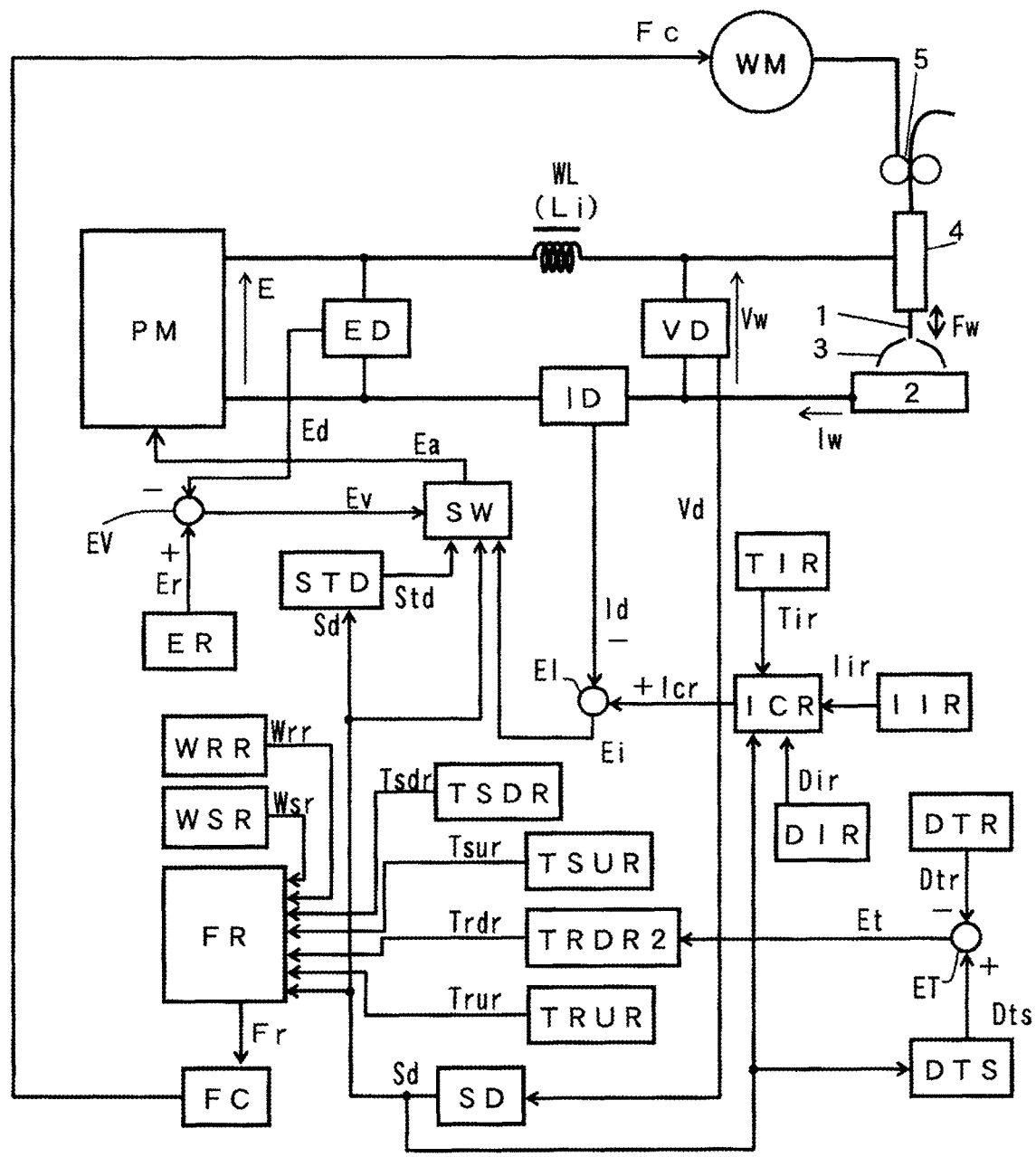
FIG. 4 is a block diagram of a welding power source for performing an arc welding control method according to a third embodiment of the present invention.

FIG. 4 is a block diagram of a welding power source for performing an arc welding control method according to the third embodiment of the present invention. FIG. 4 corresponds to FIG. 3 described above, in which the same reference numerals are attached to the same blocks, and description thereof will not be repeated. In FIG. 4, the reverse feed deceleration period setting circuit TRDR of FIG. 3 is replaced with a second reverse feed deceleration period setting circuit TRDR2, and the reverse feed peak value setting circuit WRR of FIG. 3 is replaced with a second reverse feed peak value setting circuit WRR2. Hereinafter, the blocks will be described below with reference to FIG. 4.

The second reverse feed deceleration period setting circuit TRDR2 receives the time error amplification signal Et as an input, integrates the time error amplification signal Et during welding, and outputs a reverse feed deceleration period setting signal Trdr. Integration of Trdr=Trdr0−∫Et·dt is performed during the welding. Trdr0 is a predetermined initial value. The initial value is set to, for example, 1 ms. With the time error amplification circuit ET and the second reverse feed deceleration period setting circuit TRDR2, the reverse feed deceleration period setting signal Trdr is subjected to feedback control so that the short circuit time average value detection signal Dts is equal to the short circuit time setting signal Dtr. Since the reverse feed peak value setting circuit WRR is the same as the circuit of FIG. 1, the description will not be repeated.

Since the timing chart of each signal in the welding power source of FIG. 4 showing the arc welding control method according to the third embodiment of the present invention is the same as FIG. 2 described above, so that the description will not be repeated. However, the following points are different. In the first embodiment, the reverse feed deceleration period Trd is a predetermined value. In contrast, in the third embodiment, the reverse feed deceleration period Trd is subjected to feedback control so that the short circuit time average value detection signal Dts is equal to the short circuit time setting signal Dtr. Thus, the reverse feed deceleration period Trd is a value which changes every moment during the welding.

According to third embodiment, in addition to the effects of the first embodiment, the following effects are obtained. In the third embodiment, the reverse feed deceleration period Trd is automatically adjusted so that the average value of the time lengths of the short circuit period (short circuit time average value) is a desired value. As a result, since the variation in repeated cycle between the short circuit period and the arc period is prevented, the bead appearance is always good and the stability of the welding state is further improved.

INDUSTRIAL APPLICABILITY

According to the present invention, it is possible to provide an arc welding control method capable of reducing the spatter generation amount.

Although the present invention has been described with reference to specific embodiments, the present invention is not limited to this embodiment, and various modifications are possible without departing from the technical concept of the disclosed invention. This application is based on a Japanese patent application (Japanese Patent Application No. 2017-010465) filed on Jan. 24, 2017 and a Japanese patent application (Japanese Patent Application No. 2017-073692) filed on Apr. 3, 2017, the contents of which are incorporated herein by reference.

REFERENCE SIGNS LIST

1 Welding wire
2 Base material
3 Arc
4 Welding torch
5 Feed roll
Di Increase rate
DIR Current increase rate setting circuit
Dir Current increase rate setting signal
DTR Short circuit time setting circuit
Dtr Short circuit time setting signal
DTS Short circuit time average value detection circuit
Dts Short circuit time average value detection signal
E Output voltage
Ea Error amplification signal
ED Output voltage detection circuit
Ed Output voltage detection signal
EI Current error amplification circuit
Ei Current error amplification signal
ET Time error amplification circuit
Et Time error amplification signal
ER Output voltage setting circuit
Er Output voltage setting signal
EV Voltage error amplification circuit
Ev Voltage error amplification signal
FC Feed control circuit
Fc Feed control signal
FR Feed speed setting circuit
Fr Feed speed setting signal
Fw Feed speed
ICR Current control setting circuit
Icr Current control setting signal
ID Current detection circuit
Id Current detection signal
Ii Initial current
IIR Initial current setting circuit
Iir Initial current setting signal
Iw Welding current
PM Power source main circuit
SD Short circuit determination circuit
Sd Short circuit determination signal
STD Small current period circuit
Std Small current period signal
SW Power source characteristic switching circuit
Ti Initial period
TIR Initial period setting circuit
Tir Initial period setting signal
Trd Reverse feed deceleration period
TRDR Reverse feed deceleration period setting circuit
Trdr Reverse feed deceleration period setting signal
TRDR2 Second reverse feed deceleration period setting circuit
Trp Reverse feed peak period
Tru Reverse feed acceleration period
TRUR Reverse feed acceleration period setting circuit
Trur Reverse feed acceleration period setting signal
Tsd Forward feed deceleration period
TSDR Forward feed deceleration period setting circuit
Tsdr Forward feed deceleration period setting signal
Tsp Forward feed peak period
Tsu Forward feed acceleration period
TSUR Forward feed acceleration period setting circuit
Tsur Forward feed acceleration period setting signal
VD Voltage detection circuit
Vd Voltage detection signal
Vw Welding voltage
WL Reactor
WM Feed motor
Wrp Reverse feed peak value
WRR Reverse feed peak value setting circuit
WRR2 Second reverse feed peak value setting circuit
Wrr Reverse feed peak value setting signal
Wsp Forward feed peak value
WSR Forward feed peak value setting circuit
Wsr Forward feed peak value setting signal

The invention claimed is:

1. An arc welding control method for controlling a welding in which a material of a welding wire is aluminum or an aluminum alloy, comprising:
    alternately switching a feed speed of the welding wire between a forward feed period and a reverse feed period to repeat a short circuit period and an arc period; and
    controlling a welding current for the welding so that an average value is 150 A or less, wherein the average value is an average of maximum values of the welding current for each short circuit period.

2. The arc welding control method according to claim 1, further comprising setting a reverse feed peak value during the reverse feed period so that an average value of time lengths of the short circuit periods is 7 ms or shorter, wherein the average value of time lengths is an average of time lengths of each short circuit period.

3. The arc welding control method according to claim 2, wherein an absolute value of the reverse feed peak value is set to at least 40 m/minute or more.

4. The arc welding control method according to claim 3, further comprising detecting an average value of time lengths of the short circuit periods, and performing feedback control on a reverse feed deceleration period so that the average value of the time lengths of the short circuit periods is equal to a predetermined short circuit time setting value.

5. The arc welding control method according to claim 4, further comprising
    controlling the welding current during the short circuit periods to a predetermined initial current value during a predetermined initial period, and thereafter controlling the welding current during the short circuit periods to increase with time, and setting the initial period to 1.5 ms or longer.

6. The arc welding control method according to claim 2, further comprising detecting an average value of time lengths of the short circuit periods, and performing feedback control on a reverse feed deceleration period so that the average value of the time lengths of the short circuit periods is equal to a predetermined short circuit time setting value.

7. The arc welding control method according to claim 6, further comprising
    controlling the welding current during the short circuit periods to a predetermined initial current value during a predetermined initial period, and thereafter controlling the welding current during the short circuit periods to increase with time, and setting the initial period to 1.5 ms or longer.

8. The arc welding control method according to claim 2, further comprising controlling the welding current during the short circuit periods to a predetermined initial current value during a predetermined initial period, and thereafter controlling the welding current during the short circuit periods to increase with time, and setting the initial period to 1.5 ms or longer.

9. The arc welding control method according to claim 3, further comprising controlling the welding current during the short circuit periods to a predetermined initial current value during a predetermined initial period, and thereafter controlling the welding current during the short circuit periods to increase with time, and setting the initial period to 1.5 ms or longer.

10. The arc welding control method according to claim 1, further comprising detecting an average value of time lengths of the short circuit periods, and performing feedback control on a reverse feed peak value during the reverse feed period so that the average value of the time lengths of the short circuit periods is equal to a predetermined short circuit time setting value.

11. The arc welding control method according to claim 10, further comprising controlling the welding current during the short circuit periods to a predetermined initial current value during a predetermined initial period, and thereafter controlling the welding current during the short circuit periods to increase with time, and setting the initial period to 1.5 ms or longer.

12. The arc welding control method according to claim 1, further comprising detecting an average value of time lengths of the short circuit periods, and performing feedback control on a reverse feed deceleration period so that the average value of the time lengths of the short circuit periods is equal to a predetermined short circuit time setting value.

13. The arc welding control method according to claim 12, further comprising controlling the welding current during the short circuit periods to a predetermined initial current value during a predetermined initial period, and thereafter controlling the welding current during the short circuit periods to increase with time, and setting the initial period to 1.5 ms or longer.

14. The arc welding control method according to claim 1, further comprising controlling the welding current during the short circuit periods to a predetermined initial current value during a predetermined initial period, and thereafter controlling the welding current during the short circuit periods to increase with time, and setting the initial period to 1.5 ms or longer.

* * * * *